(12) United States Patent
Kanago

(10) Patent No.: US 6,512,988 B1
(45) Date of Patent: Jan. 28, 2003

(54) FAST TEST APPLICATION SWITCHING METHOD AND SYSTEM

(75) Inventor: Kerwin D Kanago, Veradale, WA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/579,277

(22) Filed: May 25, 2000

(51) Int. Cl.⁷ .............................................. G06F 11/273
(52) U.S. Cl. ....................................... 702/123; 710/14
(58) Field of Search ........................... 702/123, 57, 61, 702/62, 69, 81, 84, 119, 120–122, 124; 703/4, 21; 710/14, 15, 36

(56) References Cited

U.S. PATENT DOCUMENTS

| | | | | |
|---|---|---|---|---|
| 4,803,683 A | * | 2/1989 | Mori et al. ................... 714/31 |
| 5,566,088 A | * | 10/1996 | Herscher et al. ............ 702/118 |
| 5,745,767 A | * | 4/1998 | Rosen et al. ................ 717/122 |
| 5,987,633 A | * | 11/1999 | Newman et al. ......... 379/10.03 |
| 5,995,741 A | * | 11/1999 | Bonnet et al. ................ 703/21 |
| 6,002,871 A | * | 12/1999 | Duggan et al. .............. 714/38 |
| 6,064,721 A | * | 5/2000 | Mohammadian et al. 379/10.01 |
| 6,195,765 B1 | * | 2/2001 | Kislanko et al. ............. 703/22 |
| 6,311,149 B1 | * | 10/2001 | Ryan et al. ................... 703/21 |
| 6,331,770 B1 | * | 12/2001 | Sugamori ................. 324/158.1 |

* cited by examiner

Primary Examiner—Marc S. Hoff
Assistant Examiner—Edward Raymond

(57) ABSTRACT

A method and system of efficiently switching between a first test application that tests a first format and a second test application that tests a second format. First, a fast test application switching module (FTASM) is loaded into a program memory. The FTASM has a format independent portion (FIP) and at least two format dependent portions (FDPs) that are specific to the particular format to be tested. The FIP is configured to be compatible with each of the format dependent portions so that any of the format dependent portions can utilize the FIP to perform testing tasks. When a first format test request is received, the FIP activates the virtual instruments associated with the first format. Then, when a second format test request is received, the FIP de-activates the virtual instruments associated with the first format and activates the virtual instruments associated with the second format. A first mechanism is provided for maintaining a plurality of settings associated with while the format dependent portion is inactive. This mechanism also automatically applies these settings to the format dependent portion when the format dependent portion is activated. A second mechanism is provided for allowing a user to individually access a plurality of settings of a particular format dependent portion when the format dependent portion is not being executed.

29 Claims, 5 Drawing Sheets

FAST TEST APPLICATION SWITCHING METHOD AND SYSTEM

FIELD OF THE INVENTION

The present invention relates generally to test equipment, and more specifically, to a fast test application switching method and system.

BACKGROUND OF THE INVENTION

Testing in the Manufacturing Process

An important aspect in any manufacturing process is the testing of the manufactured products. Testing is utilized to verify that the manufactured products function and operate properly and perform in accordance with the specifications set forth by the product design. Typically, there are a series of tests that are performed on the products at different points or stages in the manufacturing process. For example, after a particular sub-assembly of a product is manufactured, there may be tests performed to verify the specific functions of the sub-assembly. In addition to testing the sub-assemblies or sub-components, there are tests that are performed on the final product (i.e., the completed product after the final step of the manufacturing/assembling process).

In order to meet the ever increasing demand of consumers for the latest high technology gadgets and products, manufacturers are forced to constantly design and introduce new products and to bring these products to marketplace is an ever decreasing time span (i.e., to reduce product cycles times). Techniques that shorten the time needed to bring a product to market can provide a competitive advantage over competitors who do not have access to such techniques. Consequently, any such techniques or mechanisms to shorten the time-to-market are readily embraced by manufacturers.

Shortening the test time required to adequately test the functionality of the manufactured products is one way to decrease the time required to bring a new product to market. The total test time is typically a function of two factors: (1) the run time of the test (i.e., the time it takes to actually perform a particular test on the device), and (2) the test set-up time (i.e., the time it takes to configure and set-up the test equipment to perform the test). Thus, in order to decrease the total test time, it is desirable to find ways to shorten the run time of the tests and the set-up times of the tests in a cost-effective manner.

Test Equipment for the Testing of Cellular Phones

Manufacturers of cellular telephones typically utilize specialized test equipment (which is commonly referred to as a "radio frequency (RF) tester" or "RF test box" ). For example, the test equipment can measure different parameters while the cellular phone is performing certain tasks (e.g., placing a call) to ensure the proper operation of the cellular telephone. The test equipment typically includes a combination of hardware components (e.g., signal generators and measurement units) and testing programs (e.g., a first program or first test application that is written to test a first format) that are configured to test the functionality of the cellular telephones. A format includes the specifications set forth by a standards body that govern all aspects of communication (e.g., frequency, type of modulation, protocol, etc.) between a mobile unit and a base-station. Some well-known cellular telephone communication formats are IS-136, AMPS, and GSM.

Testing Single-Mode Cellular Phones

Although there are many different formats available that vary across geographic areas and telephone service providers, up to now, the majority of cellular phones are single-mode phones that utilize a single format to communicate. Accordingly, cellular telephone manufacturers only had to test a single format at a time. The test sequence for single-mode cellular telephones includes the following steps. First, the RF tester is configured to test for the format of interest (e.g., a first format).

The configuration involves loading a first program or test application (T1), which is especially written to test the first format, into a program memory (e.g., random access memory (RAM)) from a storage (e.g., a hard disk). Loading the test application typically involves rebooting the RF tester in addition to loading the new test application, thereby incurring a predetermined test set-up time. Once loaded, the RF tester is ready to test cellular telephones that operate with the first format. Unfortunately, the RF tester cannot test a cellular telephone that operates with a format different from the first format.

When it is desired to test a cellular telephone with a second format, the following steps are needed to re-configure the RF tester to test the second format. The re-configuration involves loading a second program or test application (T2) that is especially written to test the second format into the program memory from the storage. Loading the second test application incurs a predetermined test set-up time. Once loaded, the RF tester is ready to test cellular telephones that operate with the second format. Unfortunately, the RF tester can no longer test a cellular telephone that operates with the first format unless the RF tester is re-configured for testing of the first format in the manner described previously.

As can be appreciated, every time a cellular telephone with a format that is different from the format with which the RF tester is currently configured, a switch in test applications is needed. Unfortunately, every time a switch of test application occurs, a corresponding time penalty (e.g., the set-up time) is incurred. The prior art RF testers do not have a mechanism by which to quickly and efficiently switch between test applications.

However, when testing a large batch of single-mode cellular telephones that operate with a single format, the set-up time required to re-configure the tester to test a different format is tolerable since the set-up time is spread out over a large volume of devices under test (DUTs).

Testing of Multi-Mode Cellular Telephones

Advances in cellular telephones have developed multi-mode telephones that are designed to operate under more than one format. Accordingly, these multi-mode cellular telephones need to be tested for all formats that are supported by the cellular telephone. Furthermore, during testing, the set-up time is incurred every time a switch is made between a first test application for a first format and a second test application for a second format.

As it turns out, the test run time for cellular telephones per test is on the order of ten (10) to twenty (20). Unfortunately, the set-up time needed to re-configure the RF tester to accommodate a new format is on the order of two (2) to three (3) minutes. As can be readily appreciated, it is very inefficient to make a test operator wait for several minutes every time a switch in test applications is needed when the test run time is only seconds in length. In fact, a test set-up time on the order of several minutes increases the total test time by an amount that is generally unacceptable to the manufacturer.

When faced with such a problem, the manufacturer is forced to either tolerate an increased total test time, which as discussed previously, disadvantageously increases a manufacturer's time to market or to purchase additional testers (e.g., one additional tester for each different format). Both of these options are undesirable, costly, inefficient, and wasteful of resources.

Based on the foregoing, it is desirable to provide an apparatus and method for efficiently switching between at least two test applications with different formats.

SUMMARY OF THE INVENTION

A method and system of efficiently switching between a first test application that tests a first format and a second test application that tests a second format. First, a fast test application switching module (FTASM) is loaded into a program memory. The FTASM has a compact (optimized) format independent portion (FIP) and at least two format dependent portions (FDPs) that are specific to the particular format to be tested. The FIP is configured to be compatible with each of the format dependent portions so that any of the format dependent portions can utilize the FIP to perform the testing tasks. When a first format test request is received, the FIP activates the virtual instruments associated with the first format. Then, when a second format test request is received; the FIP de-activates the virtual instruments associated with the first format and activates the virtual instruments associated with the second format.

In an alternative embodiment, the FIP is first loaded into the program memory. When a first format test request is received, a first format dependent portion (e.g., a set of virtual instruments associated with the first format) is loaded into the program memory. Then, the FIP activates the virtual instruments associated with the first format. Similarly, when a second format test request is received, a second format dependent portion (e.g., a set of virtual instruments associated with the second format) is loaded into the program memory. Then, the FIP de-activates the virtual instruments associated with the first format, and activates the virtual instruments associated with the second format.

According to one aspect of the present invention, a first mechanism is provided for automatically storing the current settings a virtual instrument in the format dependent portion when the virtual instrument is de-activated and maintaining these settings while the virtual instrument is inactive. This mechanism also automatically applies these settings to the virtual instrument when the virtual instrument is activated, thereby increasing the test switching efficiency.

According to another aspect of the present invention, a second mechanism is provided for allowing a user to individually access a plurality of settings of a particular format dependent portion when that format dependent portion is not being executed.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A method and apparatus for fast and efficient test application switching are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Test System 10

Figure 1:
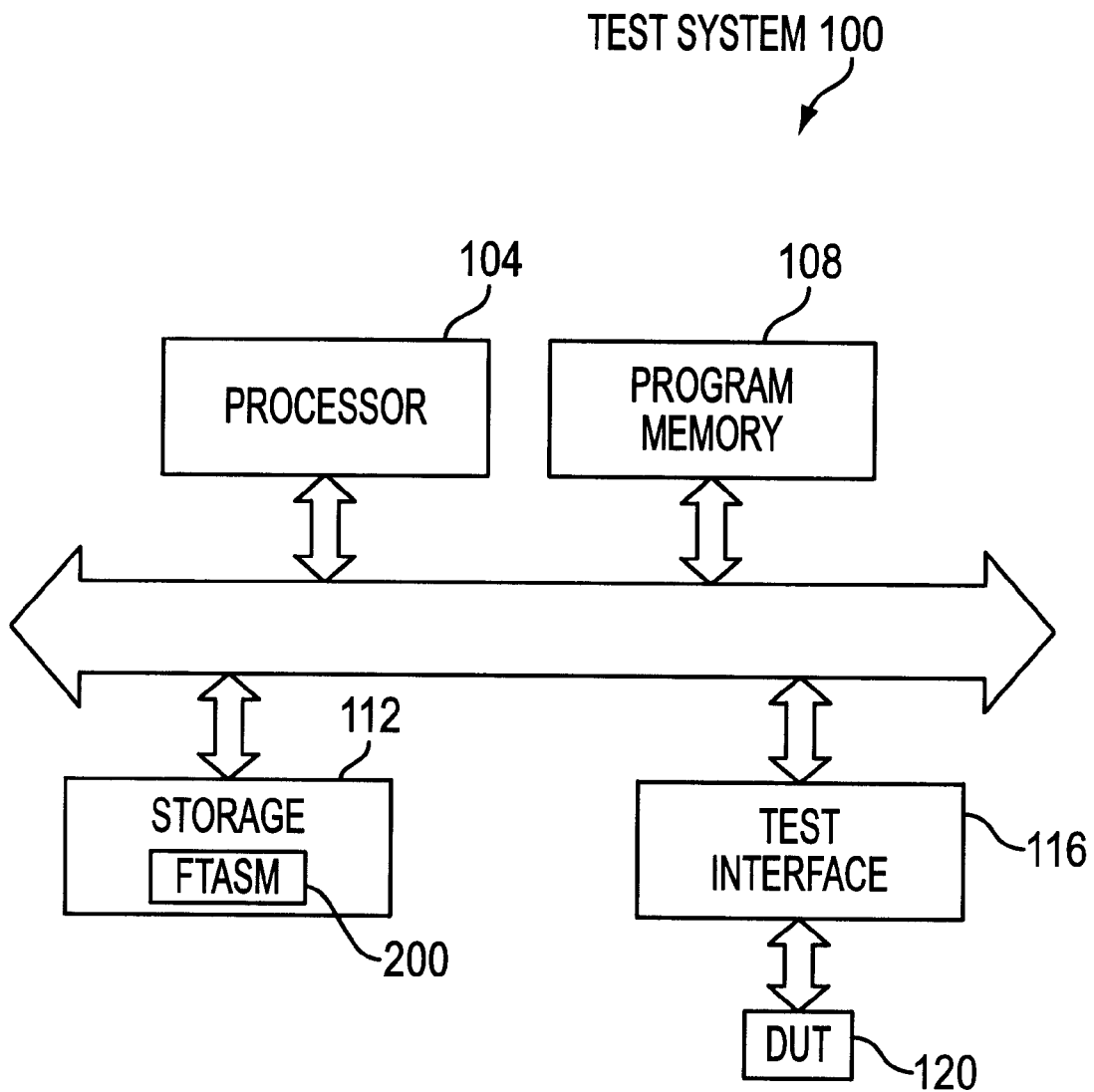
FIG. 1 is a block diagram of a test system in which the fast test application switching method and system of the present invention can be implemented.

FIG. 1 is a block diagram of a test system 100 in which the fast test application switching method and system of the present invention can be implemented. The test system 100 includes a processor 104 for executing test applications and a program memory 108 for storing the software programs, such as test applications. The program memory 108 can be, but is not limited, to a dynamic memory (e.g., a random access memory (RAM)). A secondary storage 112 (e.g., a hard disk) can be provided for storing information, such as software programs and data. The test system 100 includes a fast test application switching module 200 for performing testing for at least two different formats.

The test system 100 can perform many well-known tests on the device under test (DUT) 120, such a cellular telephone. These tests can vary depending on the particular format in which the DUT is operating. The test system 100 (also referred to as a "tester" or "test box" ) can communicate with the DUT via a wireless link (e.g., RF link) or via a wired link (e.g., a cable that connects the DUT to the tester through a test jack or test probe).

Generally, these tests can be categorized into (1) parametric tests that specify a quantitative measure of performance for the DUT (e.g., a test to determine whether the DUT performance falls within a specific range of numbers or values); and (2) functional tests that determine whether the DUT can perform a particular qualitative function (e.g., whether the DUT can turn on or properly transmit a call). Examples of such tests include, but are not limited to, signal quality tests (e.g., spectral purity tests), modulation accuracy tests, signal power tests (e.g., power output level tests and RF intensity tests), broadcast strength tests, or audio/voice quality tests.

The tester 100 is configured with the fast test application switching architecture of the present invention to efficiently switch between at least two different test applications that may have different formats. Accordingly, the fast test application switching architecture of the present invention can be utilized to (1) test a device-under-test (DUT) capable of communicating with two or more formats without excessive time delay or (2) to test a first DUT that operates with a first format and immediately thereafter to test a second DUT with a different format without excessive time delay.

A format specifies, among other parameters, the frequency of communication, the modulation scheme (e.g., TDMA, CDMA, etc.) employed, and the communication protocol between the mobile unit (e.g., cellular telephone) and the base station. The communication protocol defines the signals related to hand-shaking between the mobile unit and the base-station, hand-over of calls between base-stations, general housekeeping details, call control, channel assignment, etc.).

These formats can include, but are not limited to, IS-136 (a digital TDMA format available in North America); Advanced Mobile Phone Service (AMPS) that is an analog format available in North America), Digital AMPS (D-AMPS); Code Division Multiple Access (CDMA); Personal Communications Service (PCS), such as IS-54-based TDMA (a derivative of 800-MHz digital TDMA cellular network technology); IS-95-based CDMA (an 800-MHz digital CDMA cellular network technology); DCS-based TDMA (based on the European PCS standard, GSM); and Composite CDMA/TDMA.

Formats that are commonly used in Europe include Global System for Mobile Communications (GSM), Personal Communications Networks (PCN) that is a version of PCS radio; Digital European Cordless Telephone (DECT); Time Division Multiple Access (TDMA); Telecommunications Management Network (TMN); Universal Mobile Telecommunication System (UMTS); and Universal Personal Telecommunication (UPT).

Fast Test Application Switching Module 200

Figure 2:
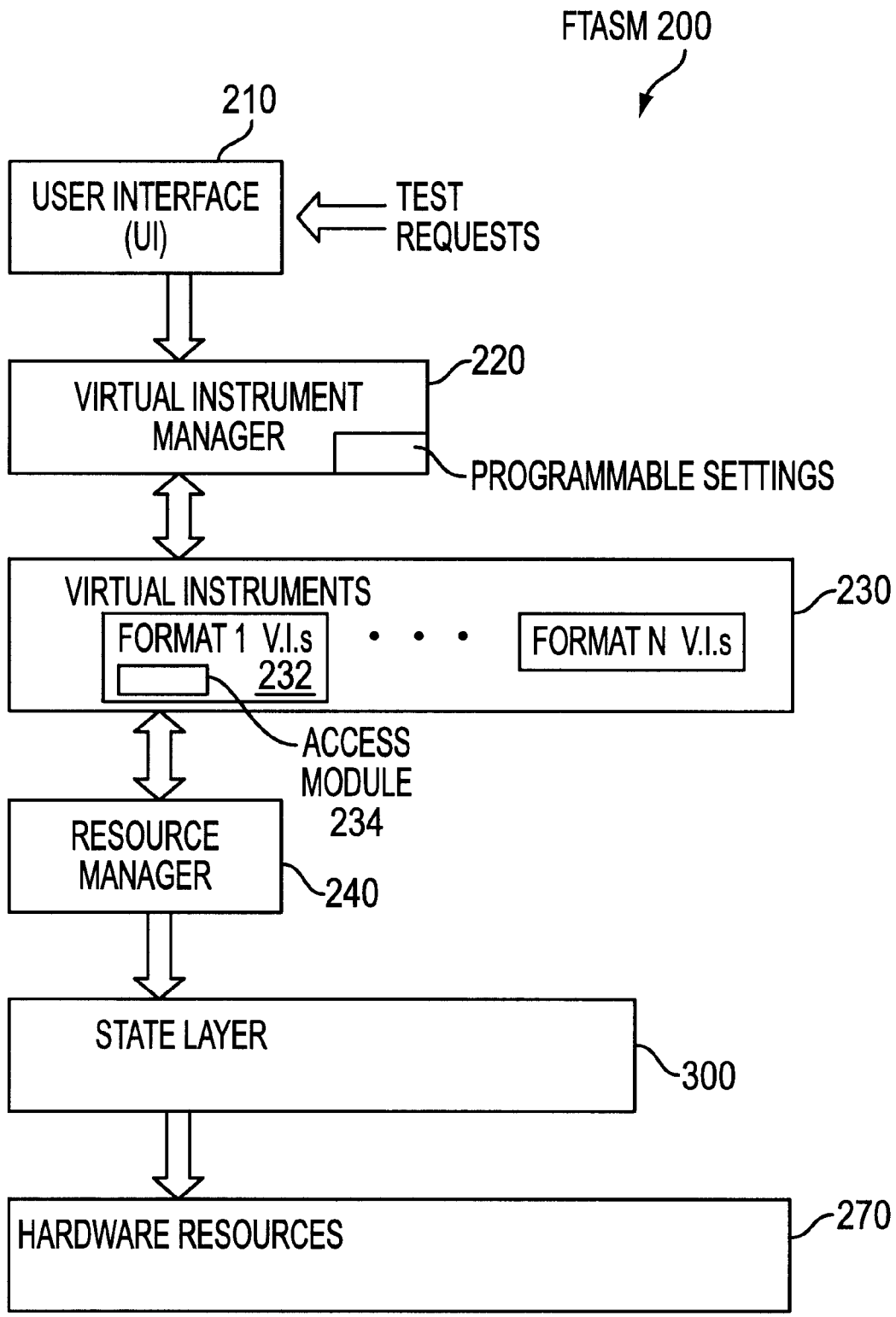
FIG. 2 is a block diagram illustrating in greater detail the fast test application switching module of FIG. 1 configured in accordance with one embodiment of the present invention.

FIG. 2 is a block diagram illustrating in greater detail the fast test application switching module (FTASM) 200 of FIG. 1 configured in accordance with one embodiment of the present invention. The fast test application switching module 200 includes a user interface 210 for allowing a user to select one of several testing formats. The FTASM 200 also includes a virtual instrument manager 220 that is coupled to the user interface 210 to receive the user input and, based thereon, selectively activates the virtual instruments associated with the format specified by the user and de-activates any virtual instruments that are currently active. The virtual instruments and the steps involved in activating and de-activating them are described in greater detail hereinafter with reference to FIGS. 4–6.

The FTASM 200 also includes a virtual instrument module 230 that has at least two groups of virtual instruments: (1) a first group 232 of virtual instruments associated with a first format (e.g., IS-136 format), and (2) a second group 234 of virtual instruments associated with a second format (e.g., GSM or AMPS format). The virtual instrument module 230 is coupled to and controlled by the virtual instrument manager 220.

It is noted that in an alternative embodiment, the virtual instrument module 230 initially includes a single group of virtual instruments associated with a first format. Upon determining a switch request provided by a user to test a second format, the virtual instruments associated with a second format is then quickly loaded into the program memory 108, and the virtual instruments associated with the first format is over-written or other discarded or released. It is noted that the architecture of the present invention is configured so that there are as many modules that are format independent with a minimum of format dependent code. The format dependent code reside in the virtual instruments and is dynamically loaded into program memory 108 when needed while the format independent code is loaded upon start-up of the test system 100. In this manner, the fast test application switching module (FTASM) 200 can switch between test applications much more efficiently than the prior art systems. This embodiment is described with reference to FIG. 2B.

Virtual instruments are program code or instructions that represent a block of functionality (e.g., a measurement). An example of a measurement is the GSM power versus time measurement or the digital TDMA power versus time measurement. In general, the virtual instrument keeps track of measurement settings and parameters that specify how to take a particular the measurement. For example, in the preferred embodiment, each virtual instrument can include the following: (1) settings that specify how to take the measurement; (2) results (e.g., the desired output); and (3) the state that indicates whether a measurement is currently being taken, and if so, how far the measurement has proceeded, or time needed to complete the measurement, etc. To thoroughly test a particular format, the average number of needed virtual instruments may range from ten to twenty.

In addition, the virtual instruments (e.g., virtual instruments 232) communicate with the lower levels of the architecture that control the resources (e.g., hardware or software) that perform the measurements. Typically, a set of virtual instruments is associated with each format. This set of virtual instruments is referred to herein as a format-dependent portion or a format-specific portion.

A resource manager 240 is coupled to the virtual instrument module 230 for allocating hardware or software resources to requesting virtual instruments.

A state layer 250 is coupled to resource manager 240 for providing low level services to the resource manager 240 and for controlling the hardware or software resources to accomplish test-related tasks. One aspect of the present invention is that the state layer 250 is configured to be format-independent so that virtual instruments across formats can share common resource control code. The format-independent state layer 250 is described in greater detail hereinafter with reference to FIG. 3.

Another aspect of the present invention is the provision of common interface between the virtual instruments 230 and the state codes in the state layer 300. The common interface allows virtual instruments within a particular format and across formats to utilize the same hardware resource (e.g., a piece of hardware) for different purposes, measurements, and tasks.

The common interface can include a Make_Setting function for configuring the hardware resource and a Make_Query function for requesting data from the hardware resource. The Make_Setting function can include two parameters: (1) a setting descriptor (e.g., carrier frequency, carrier amplitude, modulation type, on/off), and (2) a setting value (e.g., a frequency expressed in Hz) that can be a data structure of values. For example, the data structure can include an array of different values.

The Make_Query function includes two parameters: (1) a measurement identifier for specifying the desired information (e.g., a measurement or a current configuration setting), and (2) the acquired information. The acquired information can be single value (e.g., a measurement or configuration information) or a data structure of such values. For example, a measurement data structure can include an array of different values and/or can include statistical results (e.g., an average of values, standard deviation of values, a minimum value, or a maximum value).

The Make_Setting function and the Make_Query function can be implemented in each of the state code modules in the state layer 300.

Format-Independent State Layer 250

Figure 3:
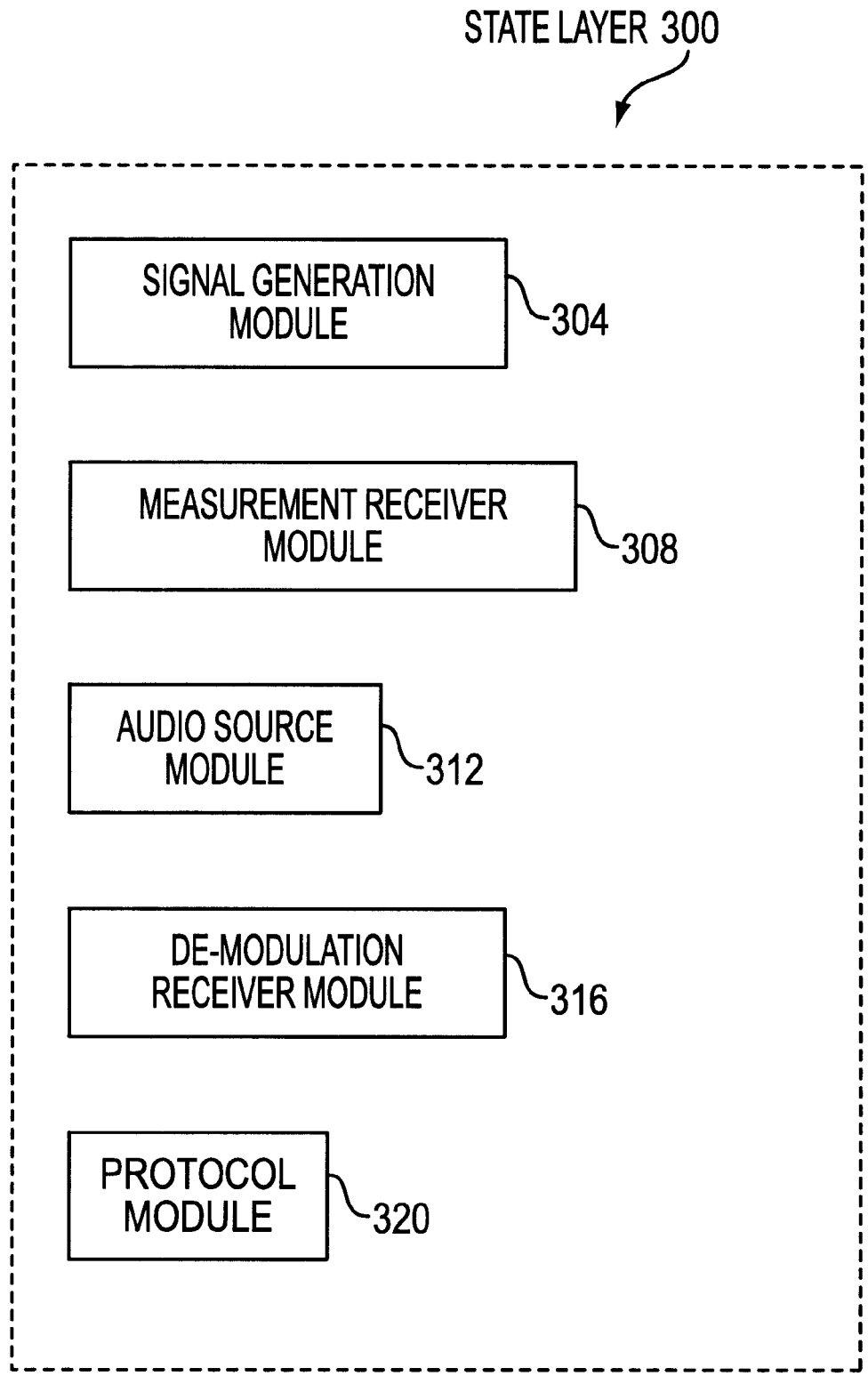
FIG. 3 is a block diagram illustrating in greater detail the state layer configured in accordance with one embodiment of the present invention.

FIG. 3 is a block diagram illustrating in greater detail the state layer 300 configured in accordance with one embodiment of the present invention. The state layer 300 includes a plurality of programs or segments of code (hereinafter referred to as state code) that control or configure a particular hardware resource (e.g., a signal generator) to perform certain test-related tasks.

For example, the state layer 300 can include state code (e.g., program modules) that control particular pieces of hardware to make certain measurements or that passes control to a particular sub-system (e.g., a co-processor) that performs a specific test-related task. Typically there is at least one state code for each different piece of hardware resource.

For example, the state layer 300 can include a signal generation module 304 for controlling the signal generation hardware, a measurement receiver module 308 for controlling the measurement receiver, an audio source module 312 for controlling the audio source hardware, a de-modulation receiver module 316 for controlling the modulation receiver, and a protocol module 320 for emulating a base station. Other modules can be provided that generate bit patterns for transmission to the DUT and that decode bits received from the DUT.

A hardware state codes (also referred to as drivers) manage the hardware configuration for a respective piece of hardware (e.g. a signal generator). Preferably, the hardware state code are dynamically re-configured by the virtual instruments through the resource manager 240 to accommodate a particular virtual instrument within a format and across formats.

It will be readily recognized by those of ordinary skill in the art that there are other hardware control modules that can be configured in the state layer 300 for controlling different pieces of hardware that can be selected to suit a particular application.

Fast Test Application Switching

Figure 4:
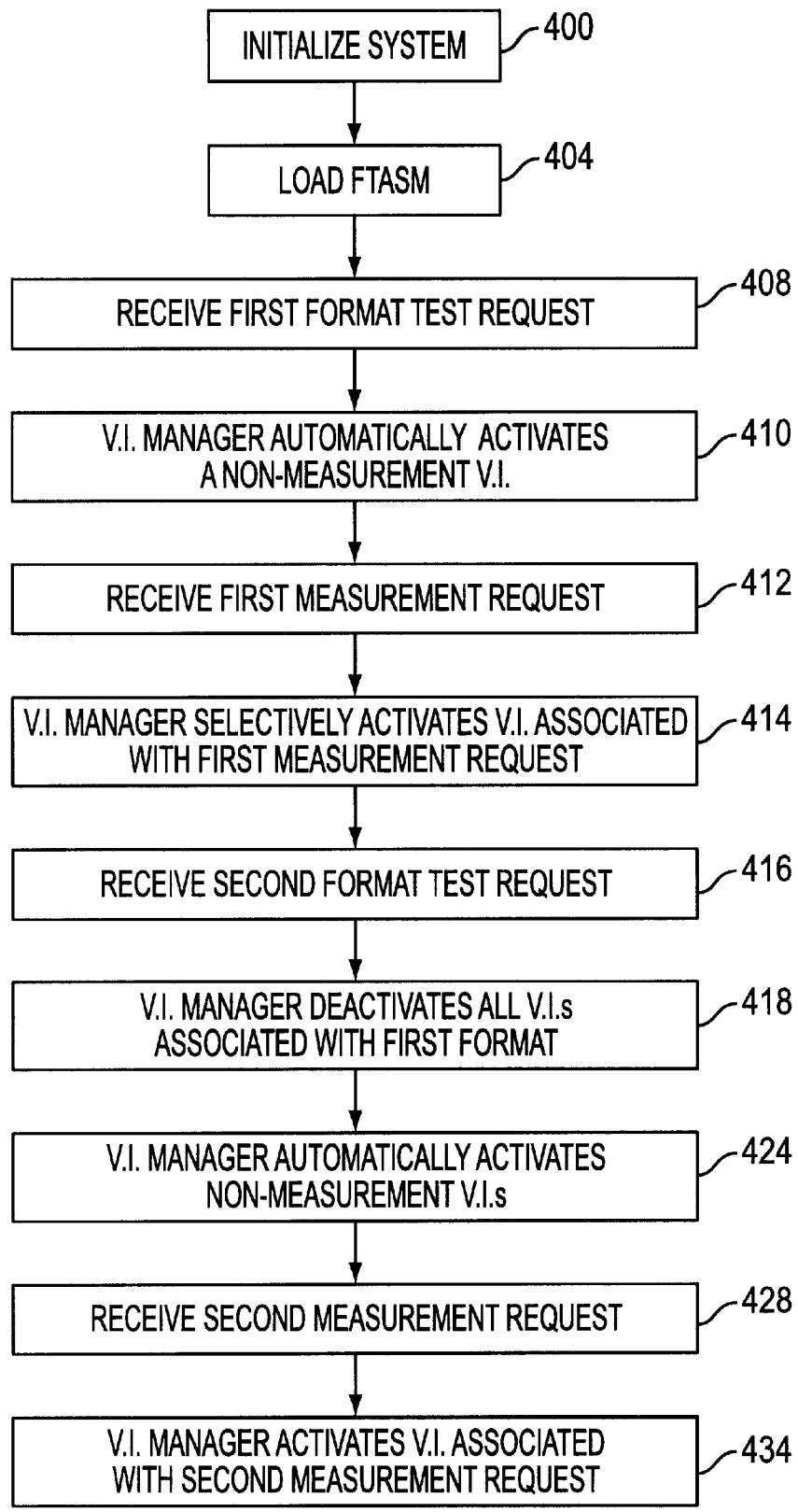
FIG. 4 is a flow chart illustrating one embodiment of the steps performed by the present invention.

FIG. 4 is a flow chart illustrating one embodiment of the steps performed by the present invention to switch test applications. In step 400, the system is initialized. In step 404, the FTASM 200 is loaded into memory 108. The term "loading" refers to moving software code from a device with a slower access time, such as a hard disk, to the memory 108 so that it is more readily accessible by the processor 104. Preferably, the FTASM having a format independent portion and at least two format dependent portions where the format independent portion is compatible with both the format dependent portions is loaded at the same time is this step. Alternatively, the format independent portion can be loaded first and the format dependent portions can be loaded into memory 108 as needed.

In step 408, a first format test request is received by the virtual instrument manager 220 via the user interface 210, for example. In step 410, the virtual instrument manager 220 automatically activates one or more non-measurement virtual instruments associated with the first format test request. Non-measurement virtual instruments are those virtual instruments that are needed to support a test format, but are not measurement specific nor have settings that require user configuration. For example, these non-measurement virtual instruments can include base station emulation virtual instrument, signal generator virtual instrument, and audio source virtual instrument. Step 410 can include the step of automatically applying previously determined settings (e.g., previously configured by user or previously stored from last measurement) to the non-measurement virtual instrument associated with the first format test request.

In step 412, the virtual instrument manager 220 receives a first measurement request that specifies a particular virtual instrument (e.g., a measurement virtual instrument). In step 414, the virtual instrument manager 220 selectively activates the virtual instrument associated with the first measurement request. Each virtual instrument can correspond, for example, to a specific measurement for the first format. Step 414 can include the step of automatically applying previously determined settings (e.g., previously configured by user or previously stored from last measurement) to the virtual instrument associated with the first measurement request;

In step 416, a second format test request is received by the virtual instrument manager 220 via the user interface 210, for example. In step 418, the virtual instrument manager 220 de-activates the virtual instrument associated with the first measurement request and the non-measurement virtual instrument associated with the first format test request. Preferably, the virtual instrument manager 220 de-activates all the virtual instruments associated with the first format. For example, if there are a plurality of non-measurement virtual instruments active or other virtual instruments associated with other measurements that are active, all these virtual instruments are de-activated in this step.

Step 418 can include the steps of automatically storing the current settings of the virtual instrument associated with the first measurement request and the current settings of the non-measurement virtual instrument associated with the first format test request. In the general case, for every virtual instrument that the virtual instrument manager 220 de-activates, the virtual instrument manager 220 also stores the current settings of that virtual instrument for future use.

In step 424, the virtual instrument manager 220 automatically activates a non-measurement virtual instrument associated with the second format test request. Step 424 can include the step of automatically applying previously determined settings (e.g., previously configured by user or previously stored from last measurement) to the non-measurement virtual instrument associated with the second format test request. In step 428, the virtual instrument manager 220 receives a second measurement request.

In step 434, the virtual instrument manager 220 activates the virtual instrument associated with the second measurement request. Step 434 includes the step of automatically applying previously determined settings (e.g., previously configured by user or previously stored from last measurement) to the virtual instrument associated with the second measurement request. The virtual instrument manager 220 can activate one or more virtual instruments associated with the second format based on user input in steps 428 and 434.

It is noted that the FTASM 200 is preferably loaded into memory 108 once in step 404. Thereafter, the test application switching method of the present invention does not require the loading of any additional code into the memory 108 during the process of switching form the first test application that is associated with a first format and a second test application that is associated with a second format. As can be appreciated, by obviating the need to load and initialize new code during each switch of test applications, the present invention improves the performance and speed of any test system incorporating the fast test application switching architecture of the present invention.

Activating Virtual Instruments (Steps 412 and 424)

Figure 5:
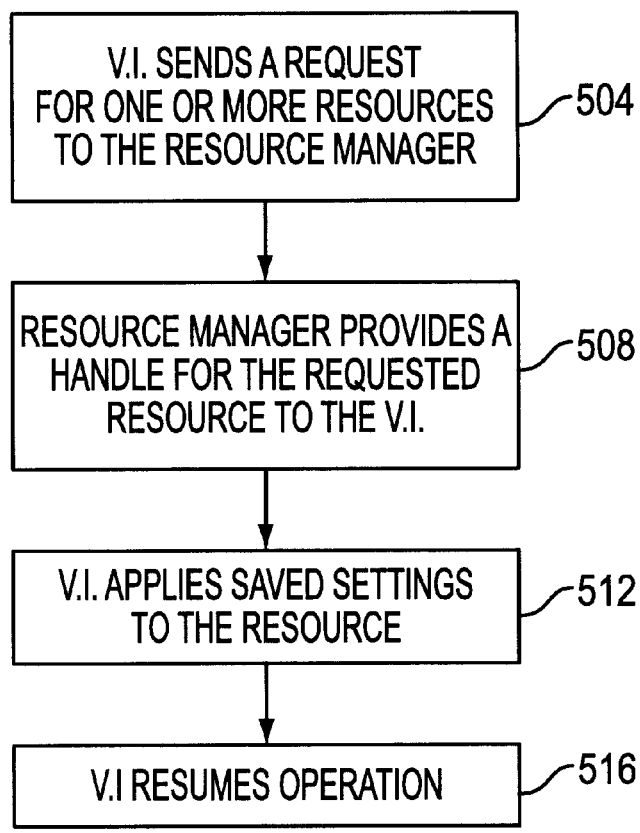
FIG. 5 is a flow chart illustrating in greater detail the step of activating a virtual instrument of FIG. 4.

FIG. 5 is a flow chart illustrating in greater detail the step of activating a virtual instrument of FIG. 4. In step 504, the virtual instrument sends a request to the resource manager 240 for one or more resources. In step 508, the resource manager 240 provides handles to the requested resources. In step 512, the virtual instrument applies or asserts its previously determined settings to the resources, thereby saving set-up and re-configuration time. The previously determined settings can be previously saved settings or, previously configured settings as explained herein below. In step 516, the virtual instrument resumes operation.

De-activating Virtual Instruments (Step 420)

Figure 6:
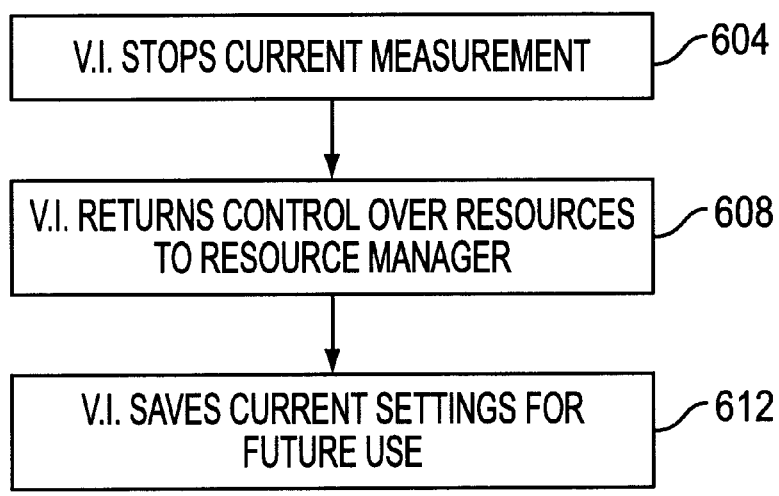
FIG. 6 is a flow chart illustrating in greater detail the step of de-activating a virtual instrument of FIG. 4.

FIG. 6 is a flow chart illustrating in greater detail the step of de-activating a virtual instrument of FIG. 4. In step 604, the virtual instrument ceases current activity or operation (e.g., collecting a measurement). In step 608, the virtual instrument returns its control over the resources (e.g., programs in the state layer) previously allocated to it back to the resource manager 240. The virtual instrument can return its control over resources to the resource manager 240 by returning the handles associated with those resources. A handle can simply be a pointer address to the beginning of code for a particular resource. In step 612, the virtual instrument saves its current settings for future use. Step 612 saves time by not requiring the tester to switch to an unknown or undesired state, receive the new settings, and then transition to those new settings. Instead, a tester having the FTASM architecture of the present invention can automatically and immediately apply these stored settings when the virtual instrument is activated (e.g., in step 512). This feature of the present invention is especially useful for those measurements having many settings, such as the output RF spectrum that involves forty or more different settings.

Another aspect of the present invention is the provision of a VI access module (e.g., access module 234 for VI 232) for each VI. The access module 234 provides user access to the settings for the VI 232 when it is not currently in use (e.g., executing). For example, the VI access module 234 allows a user to individually access (e.g., individually read, modify, or set) settings for that non-activated virtual instrument 232 while other virtual instruments are activated. In this regard, a user can set, read, or modify the setting for a non-active virtual instrument while other operations are occurring (e.g., ending a call on a previous format). Accordingly, the access modules for each virtual instrument saves time by not requiring the tester to switch to an unknown or undesired state, receive the new settings, and then transition to those new settings. Instead, a tester having the FTASM architecture of the present invention can automatically and immediately apply these previously determined settings when the virtual instrument is activated. In addition, the access modules for each virtual instrument provide flexibility to the user in accessing the virtual instrument each of the virtual instruments. As noted previously, each VI can include an access module that allows a user to access the settings of that VI when the VI is not in use.

Each virtual instrument includes one or more settings that specify the measurement required. These settings may be passed to the state layer 300 through the common interface discussed above.

Types of Device Under Test 120

The fast test application switching architecture of the present invention can be utilized to test efficiently and quickly the various devices under test (e.g., DUT 120 of FIG. 1). In particular, the fast test application switching architecture of the present invention is especially suited for DUTs that are required to or may be required to operate in more than one format. For example, these DUTs include, but are not limited to, the following: 1) multi-band cellular telephones (e.g., dual band phones with both analog and TDMA digital capabilities) without a hand-over feature (i.e., cellular telephones that can manually or automatically switch between formats between conversations); 2) "world" cellular telephones that can operate with different formats (e.g., IS-136 in the United States and GSM in European countries) depending on the geographic location of the user; 3) a cellular telephone that is manufactured with several different operating formats whose functionality must be tested, but may be distributed with only one or more formats enabled; and 4) next generation multi-band cellular telephones with a handover feature (i.e., cellular telephones that can switch between formats (e.g., CDMA, TDMA digital and analog) during a conversation).

Since the FTASM 200 is resident in the program memory 108, the present invention provides a much quicker switching time between different test applications with different formats. The switching time is decreased from one to three minutes down to several seconds, which is a fraction of the total test time required per format that is of the order of 20 to 30 seconds. By reducing the time needed to switch from one format to another format, the test time for the DUTs is substantially decreased, thereby improving the efficiency of the manufacturing and testing process.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A test apparatus configured for switching between at least two test applications comprising:
   a) a processor for executing instructions; and
   b) a fast test application switching module coupled to the processor for, when executed by the processor, efficiently switching between a first test application and a second application.

2. The apparatus of claim 1 wherein the fast test application switching module comprises:
   a format independent portion;
   at least two format dependent portions; and
   a common interface between the format independent portion and the format dependent portions for communication therebetween.

3. The apparatus of claim 1 further comprising:
   (c) a program memory;
   wherein the format independent portion and the format dependent portions are loaded at the same time into the program memory,
   and wherein no additional code is loaded into the program memory when switching between the first test application and the second application.

4. The apparatus of claim 1 further comprising:
   (c) a program memory;
   wherein the format independent portion is first loaded into the program memory; and
   wherein the format dependent portions are subsequently loaded into the program memory based on the test application specified by a user.

5. The apparatus of claim 1 further comprising:
   (c) a program memory;
   wherein the format independent portion is first loaded into the program memory;
   wherein each test application has associated therewith a format dependent portion; and
   wherein when switching between a first test application and a second application, the format dependent portion associated with the second application is loaded into the program memory.

6. The apparatus of claim 1 wherein the fast test application switching module further comprises:
   a user interface for receiving user input;
   a virtual instrument manager coupled to the user interface for specifying one group of virtual instruments associated with a particular format for execution based on the user input, wherein the virtual instrument manager is programmable by the user input;
   a resource manager coupled to the virtual instruments for managing resources on behalf of the virtual instruments; wherein the resource manager utilizes a common set of hardware resources to perform different measurements across different virtual instruments in the same format and across different formats.

7. The apparatus of claim 1 wherein the fast test application switching module further comprises:
   a state layer having at least one state code for managing access to a first hardware resource.

8. The apparatus of claim 7 wherein the state layer further comprises:
   a first function for allowing a virtual instrument to control and configure the hardware resource; and
   a second function for allowing a virtual instrument to acquire data from the first hardware resource.

9. The apparatus of claim 8
   wherein the first function includes a first parameter for specifying a setting for the hardware resource and a second parameter for specifying a value for the setting; and
   wherein the second function includes a first parameter for specifying a desired information, and a second parameter for receiving the desired information; wherein the information being one of a measurement and a current configuration setting.

10. The apparatus of claim 8
    wherein the first function is a Make_Setting function; and
    wherein the second function is a Make_Query function.

11. The apparatus of claim 7 wherein the state layer further comprises:
    a signal generation module for interfacing with a signal generator;
    a measurement receiver module for interfacing with a measurement receiver;
    an audio source module for interfacing with an audio source generator; and
    a de-modulation receiver module for interfacing with a de-modulation receiver.

12. The apparatus of claim 2 wherein each format dependent portion includes a mechanism for maintaining a plurality of settings associated therewith while the format dependent portion is inactive; and wherein the settings are automatically applied to the format dependent portion when the format dependent portion is activated.

13. The apparatus of claim 2 wherein the plurality of settings of a particular format dependent portion can be individually accessed by a user when the format dependent portion is not being executed.

14. The apparatus of claim 13 wherein the plurality of settings of a particular format dependent portion can be individually set, modified, and read by a user when the format dependent portion is not being executed.

15. A method of switching between a first test application that tests a first format and a second test application that tests a second format comprising:
    (a) loading a fast test application switching module (FTASM) into a program memory, the fast test application switching module (FTASM) having a format independent portion and at least two format dependent portions, the format independent portion compatible with both the format dependent portions;
    (b) receiving a first format test request;
    (c) automatically activating a non-measurement virtual instrument associated with the first format test request;
    (d) receiving a first measurement request;
    (e) activating the virtual instrument associated with the first measurement request;
    (f) receiving a second format test request;
    (g) de-activating the virtual instrument associated with the first measurement request and the non-measurement virtual instrument associated with the first format test request;
    (h) automatically activating a non-measurement virtual instrument associated with the second format test request;
    (i) receiving a second measurement request; and
    (j) activating the virtual instrument associated with the second measurement request.

16. The method of claim 15
    wherein step (c) includes automatically applying previously stored settings of the non-measurement virtual instrument associated with the first format test request;
    wherein step (e) includes automatically applying previously stored settings of the virtual instrument associated with the first measurement request;
    wherein step (g) includes automatically storing the current settings of the virtual instrument associated with the first measurement request and the current settings of the non-measurement virtual instrument associated with the first format test request;
    wherein step (h) includes automatically applying previously stored settings of the non-measurement virtual instrument associated with the second format test request;
    wherein step (j) includes automatically applying previously stored settings of the virtual instrument associated with the second measurement request.

17. A method of switching between a first test application that tests a first format and a second test application that tests a second format comprising:
    (a) loading a format independent portion (FIP) into a program memory, the format independent portion (FIP) being compatible with at least two different format dependent portions;
    (b) receiving a first format test request;
    (c) loading a format dependent portion associated with the first format;
    (d) automatically activating a non-measurement virtual instrument associated with the first format test request;
    (e) receiving a first measurement request;
    (f) activating the virtual instrument associated with the first measurement request;
    (g) receiving a second format test request;
    (h) loading a format dependent portion associated with the second format;
    (i) de-activating the virtual instrument associated with the first measurement request and the non-measurement virtual instrument associated with the first format test request;
    (j) automatically activating a non-measurement virtual instrument associated with the second format test request;

(k) receiving a second measurement request; and (l) activating the virtual instrument associated with the second measurement request.

18. The method of claim 17 wherein step (d) includes automatically applying previously stored settings of the non-measurement virtual instrument associated with the first format test request;

wherein step (f) includes automatically applying previously stored settings of the virtual instrument associated with the first measurement request;

wherein step (i) includes automatically storing the current settings of the virtual instrument associated with the first measurement request and the current settings of the non-measurement virtual instrument associated with the first format test request;

wherein step (j) includes automatically applying previously stored settings of the non-measurement virtual instrument associated with the second format test request;

wherein step (l) includes automatically applying previously stored settings of the virtual instrument associated with the second measurement request.

19. A method of switching between a first test application that tests a first format and a second test application that tests a second format comprising:

(a) receiving a first format test request;

(b) activating a virtual instrument associated with the first format test request;

(c) receiving a second format test request;

(d) de-activating the virtual instrument associated with the first format test request; and (e) activating a virtual instrument associated with the second format test request and automatically applying previously determined settings to the virtual instrument associated with the second format test.

20. The method of claim 19 wherein the previously determined settings are one of previously stored settings and previously configured settings.

21. A system suitable for testing a device under test that includes a first mode of operation in which the device under test communicates in accordance with a first communication format and a second mode of operation in which the device under test communicates in accordance with a second communication format comprising:

a) a processor for executing test applications;

b) a first test application when executing on the processor for testing the first mode of operation of the device under test and for determining whether the device under test complies with the first communication format;

c) a second test application when executing on the processor for testing the second mode of operation of the device under test and for determining whether the device under test complies with the second communication format; and d) a fast test application switching mechanism for efficiently switching between the first test application and the second test application.

22. The system of claim 21 wherein the first test application includes one of a parametric test that specifies a quantitative measure of performance for the device under test, a functional test that determines whether the device under test can perform a predetermined qualitative function, a signal quality test, spectral purity test, modulation accuracy test, signal power test, broadcast strength test, voice quality test, and audio quality test; and wherein the second test application includes one of a parametric test that specifies a quantitative measure of performance for the device under test, a functional test that determines whether the device under test can perform a predetermined qualitative function, a signal quality test, spectral purity test, modulation accuracy test, signal power test, broadcast strength test, voice quality test, and audio quality test.

23. (New) The system of claim 21 wherein the first communication format can specify one of a frequency of communication, a modulation scheme to be employed, a communication protocol between a mobile unit and a base station, hand-shaking between the mobile unit and the base-station, hand-over of calls between base-stations, call control, channel assignment, and other communication parameters; and wherein the second communication format can specify one of a frequency of communication, a modulation scheme to be employed, a communication protocol between a mobile unit and a base station, hand-shaking between the mobile unit and the base-station, hand-over of calls between base-stations, call control, channel assignment, and other communication parameters.

24. The system of claim 21 wherein the device under test is one of a multi-band cellular telephone without a hand-over feature, multi-band cellular telephones with a hand-over feature, a cellular telephone that can operate with different formats depending on the geographic location of the device, and a cellular telephone that is manufactured with several different operating formats.

25. The system of claim 21 wherein the first communication format can include one of IS-136, Advanced Mobile Phone Service (AMPS), Digital AMPS (D-AMPS), Code Division Multiple Access (CDMA), Personal Communications Service (PCS), IS-54-based TDMA, IS-95-based CDMA, DCS-based TDMA, Composite CDMA/TDMA, Global System for Mobile Communications (GSM), Personal Communications Networks (PCN), Digital European Cordless Telephone (DECT), Time Division Multiple Access (TDMA), Telecommunications Management Network (TMN), Universal Mobile Telecommunication System (UMTS), and Universal Personal Telecommunication (UPT); and wherein the second communication format can include one of IS-136, Advanced Mobile Phone Service (AMPS), Digital AMPS (D-AMPS), Code Division Multiple Access (CDMA), Personal Communications Service (PCS), IS-54-based TDMA, IS-95-based CDMA, DCS-based TDMA, Composite CDMA/ TDMA, Global System for Mobile Communications (GSM), Personal Communications Networks (PCN), Digital European Cordless Telephone (DECT), Time Division Multiple Access (TDMA), Telecommunications Management Network (TMN), Universal Mobile Telecommunication System (UMTS), and Universal Personal Telecommunication (UPT).

26. The system of claim 21 wherein the fast test application switching mechanism includes a format independent portion that includes a de-activation mechanism for de-activating at least one virtual instruments associated with the first communication format and an activation mechanism for activating at least one virtual instrument associated with the second communication format when a second format test request is received.

27. The system of claim 21 wherein the fast test application switching mechanism includes a first mechanism for automatically storing at least one current setting of a virtual instrument when the virtual instrument is de-activated.

28. The system of claim 27 wherein the fast test application switching mechanism includes a second mechanism for automatically applying at least one previously stored setting to the virtual instrument when the virtual instrument is activated.

29. The system of claim 21 wherein the fast test application switching mechanism includes a user interface mechanism for allowing a user to access at least one setting of a virtual instrument when the virtual instrument is not being executed.

* * * * *